United States Patent Office 3,341,534
Patented Sept. 12, 1967

3,341,534
HALOGENATED PHENOTHIAZINE CARBOXYLATE ESTERS
John S. Driscoll, Lynnfield, Mass., assignor to Monsanto Research Corporation, St. Louis, Mo., a corporation of Delaware
No Drawing. Filed June 23, 1965, Ser. No. 466,451
3 Claims. (Cl. 260—243)

This invention relates to new phenothiazine carboxylate compounds, and more particularly, provides new halogenated phenothiazine carboxylate esters.

In accordance with this invention, there are now provided novel dihalophenothiazine carboxylate esters of the formula

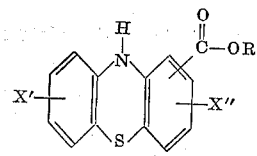

wherein each X (each of X′ and X″) is a halogen atom having an atomic weight below 80 and R is a saturated aliphatic hydrocarbon radical of from 1 to 6 carbon atoms.

The presently provided novel compounds are dichlorophenothiazinecarboxylic acid esters with lower alkyl alcohols.

Exemplary of the presently provided esters are, for example, methyl 3,7-dichlorophenothiazine-1-carboxylate, ethyl 3,7-dichlorophenothiazine-1-carboxylate, propyl 3,7-dibromophenothiazine-1-carboxylate, ethyl 3,7-dichlorophenothiazine-2-carboxylate, isopropyl 3,8-difluorophenothiazine - 1 - carboxylate, butyl 3,7 - dichlorophenothiazine-1-carboxylate, pentyl 3,7-dibromophenothiazine-4-carboxylate, isoamyl 2,8-dichlorophenothiazine-1-carboxylate, hexyl 3,7-dichlorophenothiazine-1-carboxylate, isobutyl 2,9-dibromophenothiazine-3-carboxylate, propyl 4,6-dibromophenothiazine-1-carboxylate and the like.

Preparation of the presently provided compounds is generally effected in accordance with the following equations (1)

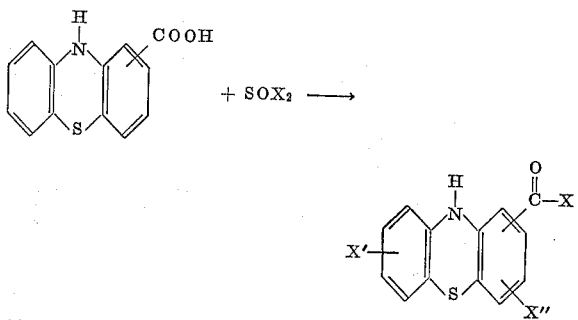

(2)

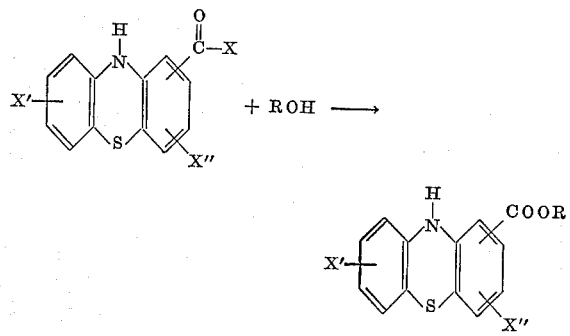

As Equation 1 illustrates, reaction of a phenothiazinecarboxylic acid with a thionyl halide produces a dihalophenothiazinecarbonyl halide. Each X in this equation represents a halogen having an atomic weight below 80, and they may be the same or different.

As Equation 2 represents, reaction of the dihalophenothiazinecarbonyl halide with an alcohol provides the dihalophenothiazinecarboxylate ester.

Selection of the thionyl halide employed to produce halogenation in the first step will control the nature of the product halogen substituents. This may be, for example, thionyl chloride, thionyl bromide, thionyl fluoride, or mixtures of these thionyl halides.

To effect the halogenation, the phenothiazinecarboxylic acid is contacted with the thionyl halide in an inert organic solvent or diluent reaction medium. This may be any of a wide variety of organic solvents; it is preferably one which is substantially unreactive with the halogenating agent, such as benzene, hexane, ethylene dichloride, carbon tetrachloride, the dimethyl ether of diethylene glycol, and so forth. The reaction mixture will include at least 3 moles of the thionyl halide per mole of the phenothiazine carboxylic acid, and preferably, the thionyl halide is present in a far greater excess, such as 50–100 moles per mole of the phenothiazine compound. The temperature of the reaction mixture can vary from down to just above the freezing temperature of the reaction mixture up to moderately elevated temperatures, ranging up to about 150° C.; temperatures from about 50° C. to about 100° C. are preferred, and the reflux temperature of the mixture is generally suitable. Ordinary atmospheric pressure is usually suitable, though pressure variation from above to below atmospheric may be used.

The reactants are maintained in contact until consumption of the thionyl halide corresponding to 3 atoms of halogen per mole of the phenothiazine compound has occurred, after which the carbonyl halide can be separated from the reaction mixture by usual means, such as filtration, extraction, distillation or the like.

Exemplary of the resulting acid halides are, for example, 3,7-dichlorophenothiazine-1-carbonyl chloride, 3,7-dibromophenothiazine-1-carbonyl bromide, 3,7-difluorophenothiazine-1-carbonyl fluoride, 3,7-dichlorophenothiazine-2-carbonyl chloride, 3,7-dibromophenothiazine-2-carbonyl bromide, 3-chloro-7-bromophenothiazine-1-carbonyl bromide, 3,8-dichlorophenothiazine-1-carbonyl chloride, 3,6-dibromophenothiazine-1-carbonyl bromide, 4,8 - dichlorophenothiazine-1-carbonyl chloride, 2,8 - dibromophenothiazine-1-carbonyl bromide, 2,7-dichlorophenothiazine-4-carbonyl chloride and the like.

Lower alkanols which may be employed in the conversion of the carbonyl halide to the phenothiazinecarboxylate ester include, for example, methyl alcohol, ethyl alcohol, n-propyl alcohol, isopropyl alcohol, n-butyl alcohol, sec-butyl alcohol, tert-butyl alcohol, amyl alcohol, isoamy alcohol, n-hexanol, isohexanol, and the like.

Formation of the ester is effected by mixing the dihalophenothiazinecarbonyl halide with the selected alcohol. The reactants may be present in any desired ratio but it is usually convenient to use an excess of the alcohol, to provide the reaction medium; other inert organic solvents, such as ethylene glycol dimethyl ether, ethylene dichloride or the like, may also be present if desired. The reaction proceeds readily at ambient pressure and at temperatures in the range of 0° to 150° F.; usually the reflux temperature of the reaction mixture is suitable and convenient. Recovery of the ester is readily effected by usual means such as filtration, extraction, distillation and the like.

The present provided novel esters are stable, generally solid materials, useful for a wide variety of agricultural and industrial purposes. Compounds as provided by the invention are toxic to species of the plant and animal kingdom, and may be applied, for example, to control the growth of vegetation, and to produce kill of lower forms of animal life such as flies, and the like. These novel compounds may also be employed for pharmaceutical purposes, as dyes, as intermediates for the preparation of drugs and of dyes.

The invention is illustrated but not limited by the following examples, in which all parts are by weight.

EXAMPLE 1

This example illustrates the preparation of a dihalophenothiazine-1-carbonyl halide.

A suspension of one part of phenothiazine-1-carboxylic acid in about 5 parts dry benzene and 3.2 parts of thionyl chloride is refluxed for one hour. The resulting precipitate is filtered, washed with about 25 parts benzene, and dried to yield a red solid, M.P. 213–215° C. (decomp.). This is essentially pure dichlorophenothiazine-1-carbonyl chloride: recrystallization from benzene gives no increase in the melting point. This compound analyzes correctly for the assigned formula, $C_{13}H_6Cl_3NOS$, and has an infrared spectrum corresponding to the assigned structure.

EXAMPLE 2

This example illustrates the preparation of an alkyl dihalophenothiazinecarboxylate.

A mixture of 0.6 part of the dichlorophenothiazinecarbonyl chloride prepared as described in Example 1 and 38 parts of absolute ethanol is stirred with reflux for two hours. The reaction mixture is then filtered and let stand, whereupon a bright yellow solid precipitates in the filtrate This is recovered and dried to give ethyl dichlorophenothiazine-1-carboxylate as yellow needles, which, after recrystallization from ethanol, melt at 156.5–157.5° C. The product has spectral characteristics and an elemental analysis corresponding to the assigned structure

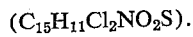

($C_{15}H_{11}Cl_2NO_2S$).

EXAMPLE 3

This example illustrates utilization of compounds prepared in accordance with this invention as agricultural toxicants.

Ethyl dichlorophenothiazine-1-carboxylate is applied as an aqueous spray to soil containing pigweed seeds, among others, at a rate equal to 10 lbs. per acre of the chemical. The sprayed, seed-containing soil is held in a greenhouse and observed for growth. Suppression of growth of the pigweed is substantially complete, while other species such as rye grass are unharmed by the treatment and emerge and flourish like controls to which the chemical has not been applied.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A dihalophenothiazine carboxylate ester of the formula

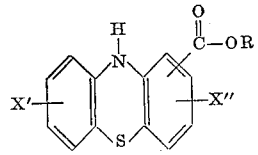

where X′ and X″ are halogen atoms having an atomic weight below 80 and R is a saturated aliphatic hydrocarbon radical from 1 to 6 carbon atoms.

2. A compound of claim 1 wherein each X is a chlorine atom.

3. A compound of claim 2 wherein R is an ethyl radical.

No references cited.

WALTER A. MODANCE, *Primary Examiner.*

H. I. MOATZ, *Assistant Examiner.*